Figure 1:
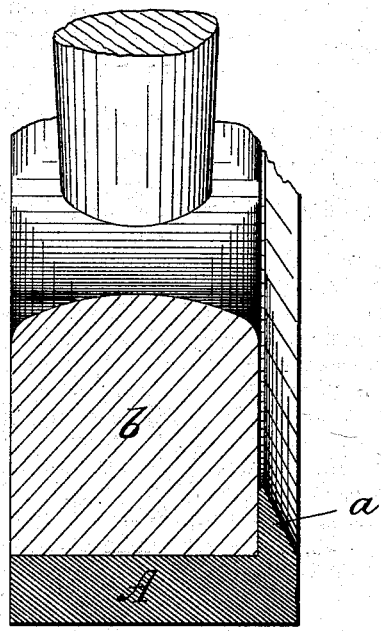

(No Model.)

A. DICKINSON & J. WARDEN.
TIRE FOR VEHICLE WHEELS.

No. 252,304. Patented Jan. 17, 1882.

WITNESSES:
Jos. B. Connolly
W. M. Connolly

Abram Dickinson
Joseph Warden
INVENTORS

Connolly Bros. & McTighe
ATTORNEYS

UNITED STATES PATENT OFFICE.

ABRAM DICKINSON AND JOSEPH WARDEN, OF PITTSBURG, PA.

TIRE FOR VEHICLE-WHEELS.

SPECIFICATION forming part of Letters Patent No. 252,304, dated January 17, 1882.

Application filed September 15, 1881. (No model.)

*To all whom it may concern:*

Be it known that we, ABRAM DICKINSON and JOSEPH WARDEN, of Pittsburg, in the county of Allegheny and State of Pennsylvania, have invented certain new and useful Improvements in Wheel-Tires; and we do hereby declare that the following is a full, clear, and exact description of the invention, which will enable others skilled in the art to which it appertains to make and use the same, reference being had to the accompanying drawings, which form a part of this specification, in which—

Figure 1 is a transverse section of a wheel-felly with our improved tire.

This invention relates to the construction of iron or steel tires for vehicle-wheels, whereby the fellies are protected against the grinding and straining of stones, railway-tracks, and other obstructions daily found in ordinary travel, and the wheel and tire generally strengthened and stiffened.

The invention consists in rolling the tire-bar with a beveled flange on one edge, which is so applied to the wheel that the flange stands as a guard to cover and protect the felly, as hereinafter fully described and claimed.

In the drawings, A designates the tire, consisting of the ordinary tire portion, having the flange *a* along one edge projecting at right angles to the bar, and having the outer face of the flange *a* beveled down to a comparatively sharp edge to form a finish to the wheel, the angle inclosed by the tire and its flange being a sharp right angle without a fillet. The tire is bent and welded in the usual way and heated so as to expand, just as tires are always applied. It is then applied to the wheel and driven on, the flange *a* forming a convenient place to hammer. The flange *a* forms a reliable gage, so that the smith can drive till the flange prevents further movement, when he knows it is in its proper position. Hence the tire cannot be fitted on in such a way as to produce a tendency to wabble when in use, which happens commonly with the plain tires now used. The tire is applied so that the flange *a* will be on the outside of the felly *b*, and as it overhangs the felly by the thickness of the iron in the flange, the felly is fully protected when in use.

It is well known that the tires of city vehicles soon wear round from incessant rubbing and grinding against the paving-stones, curbing, street-car tracks, safety-columns, and fender-posts. This wear becomes so great that frequently these obstructions strike the felly with a severe shock, and the felly, being of wood, either breaks or cracks or gradually wears down, in all cases either destroying or weakening the wheel very seriously. By our invention, however, the felly is fully protected, since the flange *a* overhangs the felly, and the latter cannot be reached by the described obstructions. The result is that the fellies and wheel maintain their original strength for an indefinite length of time, and the amount of service obtainable without repairs is very largely increased. The tire made in this way is also applicable, with the same beneficial results, to sleigh and sled runners. The tire can be made as easily as the present plain tire, and its cost will be a mere trifle higher, on account of the slight additional weight of metal in the flange.

We are aware that a flanged tire is not broadly new, and we do not therefore claim such; but we are not aware that a flanged tire has been made of such shape that it can be set on the wheel without rabbeting or grooving the felly beforehand.

We claim as our invention—

The combination of the plain ungrooved felly *b* and the flanged tire A, having its inner faces meeting at a right angle and the outer face of its flange beveled, substantially as and for the purposes described.

In testimony that we claim the foregoing as our own we have hereto affixed our signatures in presence of two witnesses.

ABRAM DICKINSON.
JOSEPH ×̲ WARDEN.
<sub>his</sub>  <sub>mark.</sub>

Witnesses:
T. J. McTIGHE,
THOMAS J. PATTERSON.